(12) United States Patent
Pfister

(10) Patent No.: US 6,442,805 B2
(45) Date of Patent: Sep. 3, 2002

(54) ATTACHMENT SYSTEM FOR CONFIGURED SLOTS

(76) Inventor: Joel W. Pfister, 4967 Kensington Gate, Shorewood, MN (US) 55331

( * ) Notice: Subject to any disclaimer, the term of this patent is extended or adjusted under 35 U.S.C. 154(b) by 0 days.

(21) Appl. No.: 09/773,216

(22) Filed: Jan. 31, 2001

Related U.S. Application Data

(60) Continuation-in-part of application No. 09/736,778, filed on Dec. 14, 2000, which is a division of application No. 09/398,970, filed on Sep. 17, 1999, now Pat. No. 6,161,262, which is a division of application No. 09/276,879, filed on Mar. 26, 1999, now Pat. No. 6,119,317.

(51) Int. Cl.[7] ............................ A47B 96/06; F21L 15/04
(52) U.S. Cl. ................... 24/514; 24/569; 248/223.41; 248/125.1
(58) Field of Search .................... 24/514, 568, 569; 403/180, 297, 314, 374.4, 374.3; 52/655.1; 248/223.41, 297, 125.1

(56) References Cited

U.S. PATENT DOCUMENTS

| | | | | |
|---|---|---|---|---|
| 819,259 A | * | 5/1906 | White | 24/514 X |
| 3,829,226 A | * | 8/1974 | Kreusel | 403/297 X |
| 3,966,342 A | * | 6/1976 | Moriya | 403/297 X |
| 4,700,437 A | * | 10/1987 | Hoshino | 24/514 X |
| 4,846,431 A | * | 7/1989 | Pflieger | 24/569 X |
| 4,901,963 A | * | 2/1990 | Yoder | 24/514 X |
| 4,907,388 A | * | 5/1990 | Siahatgar | 403/252 |
| 5,176,462 A | * | 1/1993 | Chen | 403/252 |
| 5,657,604 A | * | 8/1997 | Malott | 52/655.1 |
| 5,673,531 A | * | 10/1997 | Carcedo et al. | 52/655.1 X |

* cited by examiner

Primary Examiner—Robert J. Sandy
(74) Attorney, Agent, or Firm—Hugh D. Jaeger

(57) ABSTRACT

An attachment system for configured slots which utilizes pivotally opposed major and minor jaws which can be biased in a closed or in an open position. The major and minor jaws are aligned in the receptor cavity of a configured rectangular tube and are actuated to fully and to frictionally engage the receptor cavity. Such actuation also causes outwardly-facing grooves on the ends of the major and minor jaws to engage a suitably-shaped configured slot on a configured tube or other structure. Such preceding action connects a configured rectangular tube and a structure having a suitably-shaped configured slot by the use of the intermediate major and minor jaws. Provisions are also made for snapping engagement of the pivotally opposed major and minor jaws of biased open major and minor jaws with a suitably-shaped configured slot.

16 Claims, 13 Drawing Sheets

ATTACHMENT SYSTEM FOR CONFIGURED SLOTS

CROSS REFERENCES TO CO-PENDING APPLICATIONS

This patent application is a continuation-in-part of Ser. No. 09/736,778 entitled "Clamp Assembly" filed on Dec. 14, 2000, pending, which is a division of Ser. No. 09/398,970 entitled "Clamp Assembly" filed on Sep. 17, 1999, U.S. Pat. No. 6,161,262, which is a division of Ser. No. 09/276,879 entitled "Clamp Assembly" filed on Mar. 26, 1999, U.S. Pat. No. 6,119,317.

BACKGROUND OF THE INVENTION

1. Field of the Invention

The present invention is for an attachment system for configured slots.

2. Description of the Prior Art

Representative prior art patents are U.S. Pat. Nos. 3,015,897; 3,189,187; 3,338,602; 3,574,367; 4,101,231; 4,207,014; 4,360,286; 4,549,832; 4,572,694; 4,725,030; 4,907,388; 5,657,604; European Patent No. 0,336,915; French Patent Nos. 2,129,259; 2,298,721; 2,659,702; Dutch Patent No. 8,901,425; and Norwegian Patent No. 96,260.

SUMMARY OF THE INVENTION

The general purpose of the present invention is to provide an attachment system for configured slots and, more particularly, to provide an attachment system for readily connecting a configured rectangular tube or other object to a suitably-shaped configured slot, such as in a configured tube which can be a configured round tube, a configured rectangular tube or any other appropriately configured geometrical tube structure or other structure having a suitably-shaped configured slot.

According to one embodiment of the present invention, there is provided an attachment system including a jaw assembly the majority of which is accommodatingly engaged within one end of a configured rectangular tube or other geometrically configured structure. The jaw assembly includes opposing major and minor jaws aligned in close pivotal juxtaposition. The major jaw includes an inwardly-facing pivot bar which aligns to and which engages an inwardly-facing pivot receptor groove in the minor jaw. Outwardly-facing retainer grooves are located at one end of both the major and minor jaws for engagement with a suitably-shaped configured slot in a configured tube. At the ends of the major and minor jaws opposing the retainer grooves is a provision for the retention of a resilient plastic pin in either of two pre-determined locations. One such location biases the ends of the major and minor jaws (having the retainer grooves) to the open or spread position, and the other location biases the ends of the major and minor jaws to the closed position. Substantially, the entire jaw assembly with the exception of the retainer grooves is housed in one end of the configured rectangular tube and is secured therein by an actuator cap screw. The actuator cap screw extends through the configured rectangular tube to threadingly engage the major jaw. The actuator cap screw also extends beyond the major jaw to forcefully contact the minor jaw whereby the minor and major jaws are forcefully caused to spread apart, thereby causing frictional engagement of the retainer grooves with a geometrical tube structure having a suitably-shaped configured slot. Additionally, the actuator cap screw also forces planar and other surfaces of the major and minor jaws into intimate and aligned stabilizing forced contact with interior surfaces of the suitably-shaped configured rectangular tube.

One significant aspect and feature of the present invention is an attachment system for configured slots for connecting a configured rectangular tube to a suitably-shaped configured slot by the use of a connecting jaw assembly.

Another significant aspect and feature of the present invention is a jaw assembly having pivotally opposing major and minor jaws where each jaw includes an outwardly-facing retainer groove.

Still another significant aspect and feature of the present invention is the use of a resilient plastic pin placed in either of two positions at one end of pivotally opposing major and minor jaws to bias the jaws to either the closed or to the open position for subsequent acceptance and accommodation by a configured rectangular tube.

Yet another significant aspect and feature of the present invention is major and minor jaws biased to the open position which can provide for initial snapping engagement with a suitably-shaped configured slot.

Another significant aspect and feature of the present invention is an actuator cap screw which secures a jaw assembly to a configured rectangular tube.

Another significant aspect and feature of the present invention is an actuator cap screw which actuates the major and minor jaws of a jaw assembly for forced frictional engagement with the receptor cavity of a configured rectangular tube.

Another significant aspect and feature of the present invention is an actuator cap screw which forces planar and other surfaces of the major and minor jaws into intimate and stabilized forced contact with interior surfaces of a configured rectangular tube to provide for a stabilized relationship between a configured rectangular tube and an object having configured slots herein exemplified as a configured tube.

Having thus described one or more embodiments of the present invention, it is the principal object of the present invention to provide an attachment system for configured slots.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
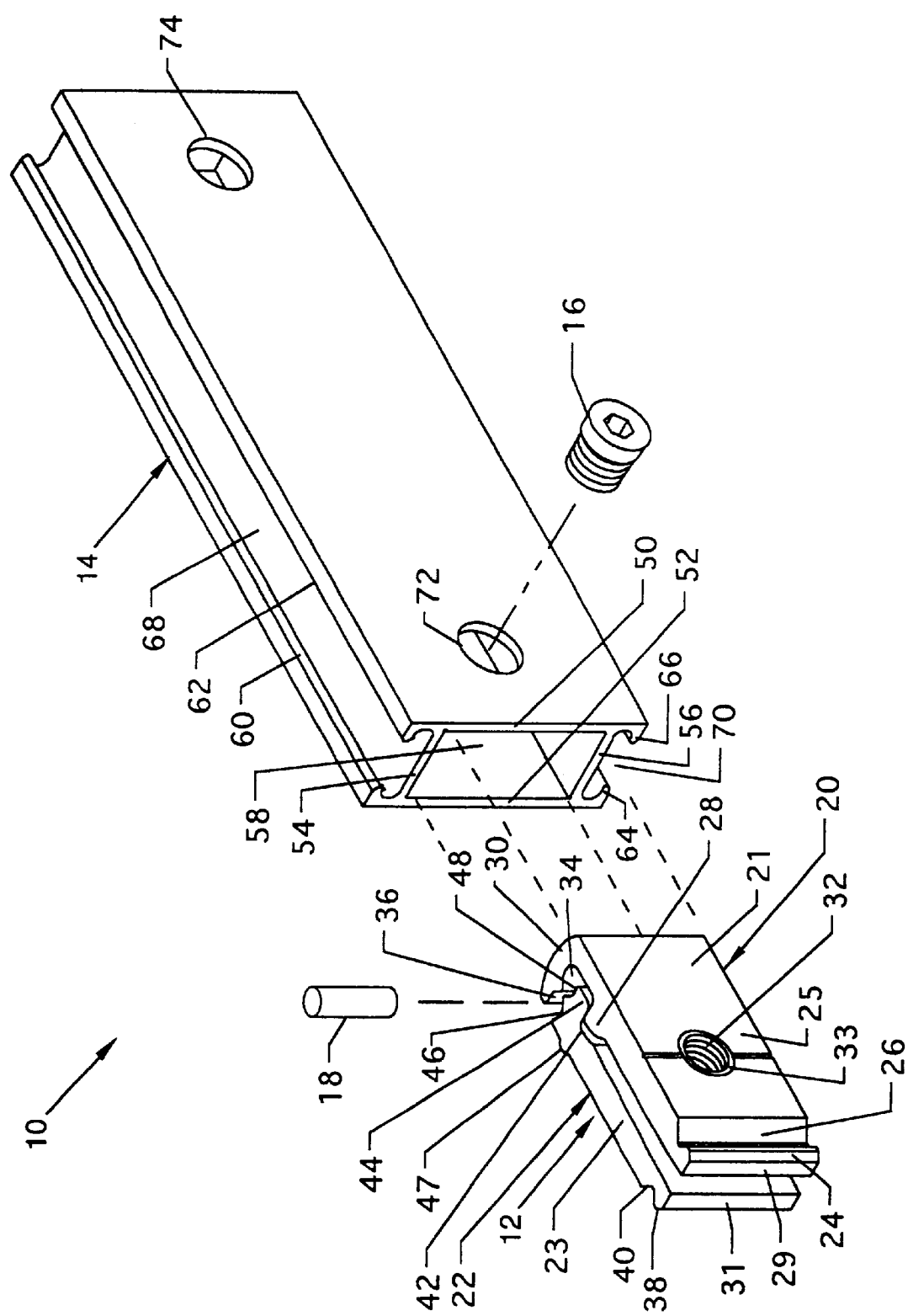
FIG. 1 illustrates an isometric view of the attachment system for configured slots; the present invention.
Figure 2:
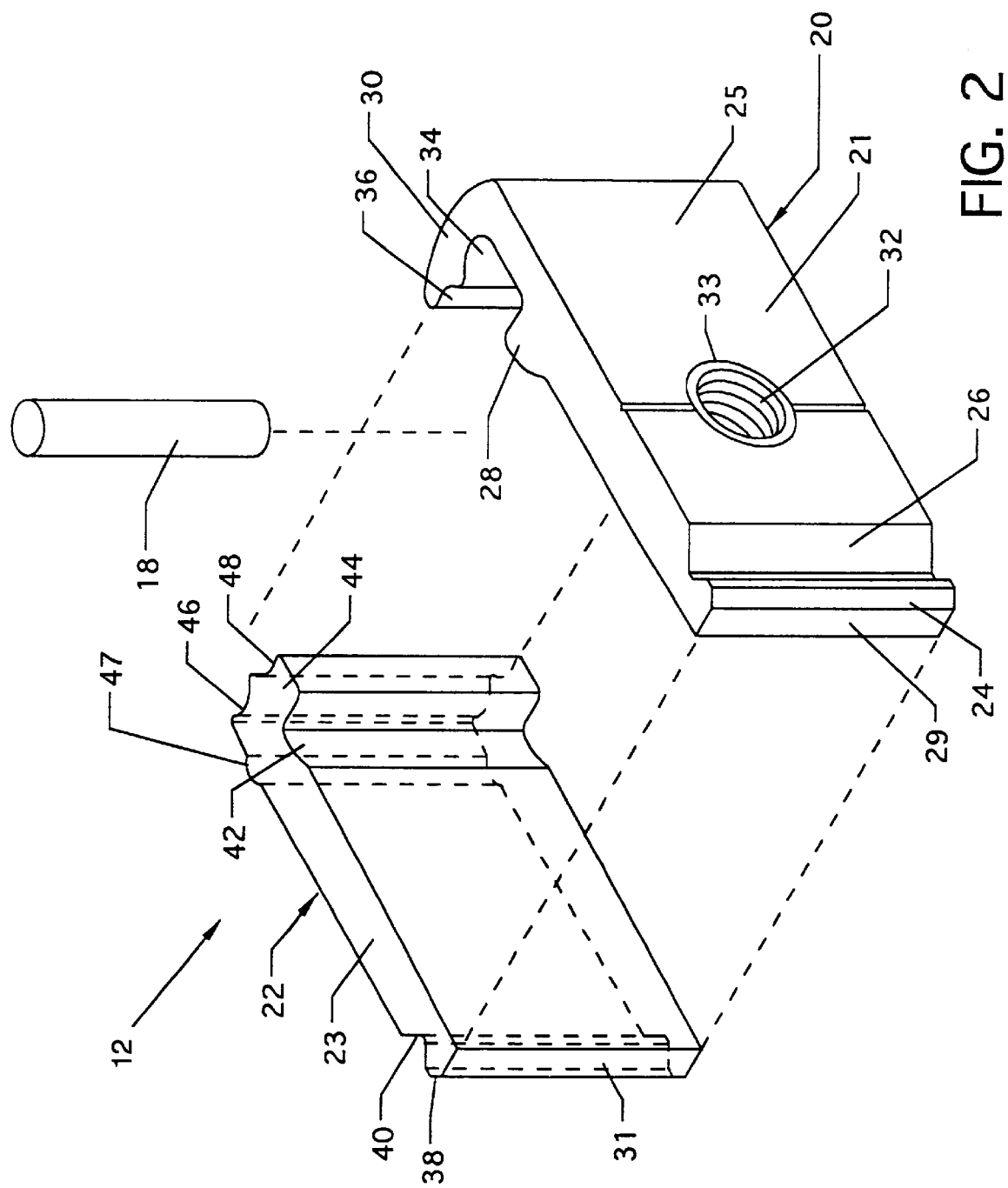
FIG. 2 illustrates an exploded isometric view of the jaw assembly.

FIG. 1 illustrates an isometric view of the attachment system for configured slots 10 the components of which include a jaw assembly 12, a configured rectangular tube 14, and an actuator cap screw 16. The jaw assembly 12 includes opposing major and minor jaws 20 and 22, respectively, aligned in close pivotal juxtaposition, and a resilient plastic pin 18. The major jaw 20 and the minor jaw 22 resemble each other for the most but the structure at one end of the major jaw 20 and the minor jaw 22 includes varying structure to accommodate the resilient plastic pin 18 in two different positions, as described later in detail. The one-piece major jaw 20, which can be extruded, is generally planar and includes a main body 21 and various structures located on or extending from the main body 21 including, but not limited to, a planar surface 25 extending along the main body 21, an end 29 having a chamfer 24 and an outwardly-facing retainer groove 26 adjacent to the chamfer 24, a vertically-oriented and inwardly-facing pivot bar 28 near another end of the main body 21, an extension 30 directed substantially at a right angle and inwardly from the main body 21, a threaded hole 32 extending horizontally through the approximate mid-section of the main body 21, and an undercut 33 at the exterior portion of the threaded hole 32. Also included in the major jaw 20 is a vertically-oriented truncated circular channel 34 which is located at the junction of the main body 21 and the extension 30, and another vertically-oriented truncated circular channel 36 located on the extension 30 adjacent to and inwardly of the truncated circular channel 34. The one-piece minor jaw 22, which can be extruded, is generally planar and includes a main body 23 and various structures located on or extending from the main body 23 including, but not limited to, an end 31 having a chamfer 38 and an outwardly-facing retainer groove 40 adjacent to the chamfer 24, a vertically-oriented and inwardly-facing pivot receptor groove 42 near another end of the main body 23, and a small extension 44 directed substantially at a right angle and inwardly from the main body 23. Also included in the minor jaw 22 is a vertically-oriented truncated circular channel 46 which is located at the outward region of the extension 44 and another vertically-oriented truncated circular channel 48 located at the inward region of the extension 44 adjacent to and inwardly of the truncated circular channel 46. A vertically-oriented contact bar 47 extending outwardly from the outwardly-facing surfaces of the minor jaw 22, as also shown in FIG. 2. The resilient plastic pin 18 can align between the truncated circular channel 34 of the major jaw 20 and the truncated circular channel 48 of the minor jaw 22, or in the alternative, the resilient plastic pin 18 can align between the truncated circular channel 36 of the major jaw 20 and the truncated circular channel 46 of the minor jaw 22 to provide for biasing of the major jaw 20 and the minor jaw 22 to the opened or to the closed position, respectively, as later described in detail.

The configured rectangular tube 14 is structured to accommodate the jaw assembly 12 in a central location and to accommodate the actuator cap screw 16, and includes upper and lower channels along the upper and lower regions to accommodate other structure. The configured rectangular tube 14 includes opposing vertically-oriented walls 50 and 52 having horizontally-oriented opposing walls 54 and 56 extending therebetween to form a receptor cavity 58 for the accommodation of the jaw assembly 12. The opposing vertically-oriented walls 50 and 52 extend beyond the horizontally-oriented opposing walls 54 and 56 and at one end are directed inwardly to form opposing upper and inwardly-directed lips 60 and 62, and at the other end are directed inwardly to form opposing lower and inwardly-directed lips 64 and 66. The lips 60 and 62, the horizontal wall 54, and portions of the vertical walls 50 and 52 form an upper channel 68, and, correspondingly, the lips 64 and 66, the horizontal wall 56, and portions of the vertical walls 50 and 52 form a lower channel 70. The receptor cavity 58 extends the entire length of the configured rectangular tube 14 and can accommodate a jaw assembly 12 at either or both ends. Accordingly, body holes 72 and 74 are included to extend through the vertically-oriented wall 50 to allow passage of an actuator cap screw 16 therethrough to engage the threaded hole 32 of a jaw assembly 12 for actuation of the jaw assembly 12 and for positively locating and referencing the jaw assembly 12 within the configured rectangular tube 14.

FIG. 2 illustrates an exploded isometric view of the jaw assembly 12, where all numerals correspond to those elements previously described.

Figure 3:
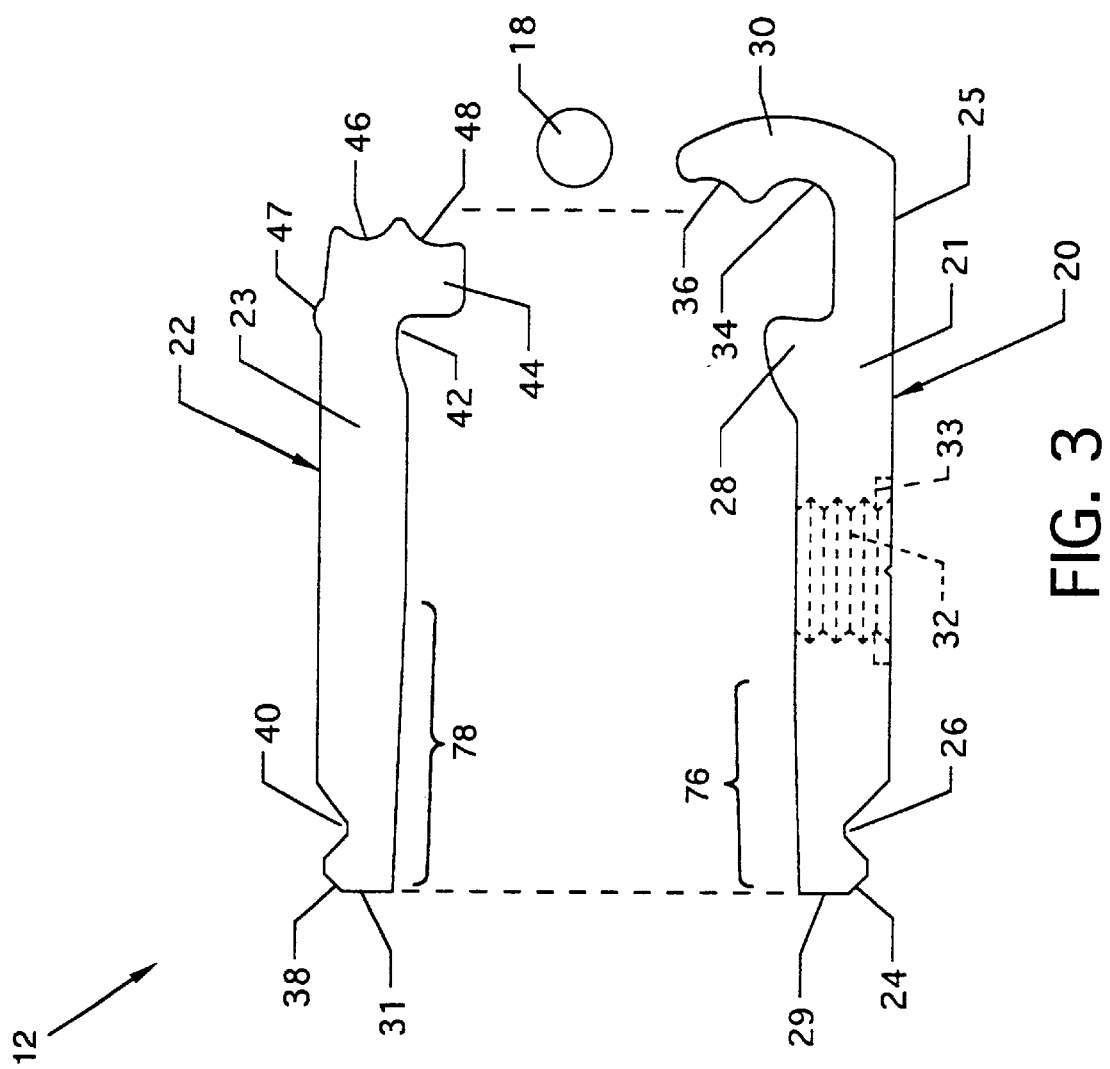
FIG. 3 illustrates a top view of the unassembled jaw assembly.

FIG. 3 illustrates a top view of the unassembled jaw assembly 12. Illustrated in particular are the inwardly-facing tapered surfaces 76 and 78 which allow the areas at the ends 29 and 31 of the major and minor jaws 20 and 22 to present a minimum profile across the width of the major and minor jaws 20 in the region of the chamfers 24 and 38, as viewed in FIG. 4. Such minimum profile is desirable with respect to engagement of the ends 29 and 31 of the major and minor jaws 20 and 22 with a suitably-shaped configured slot.

Figure 4:
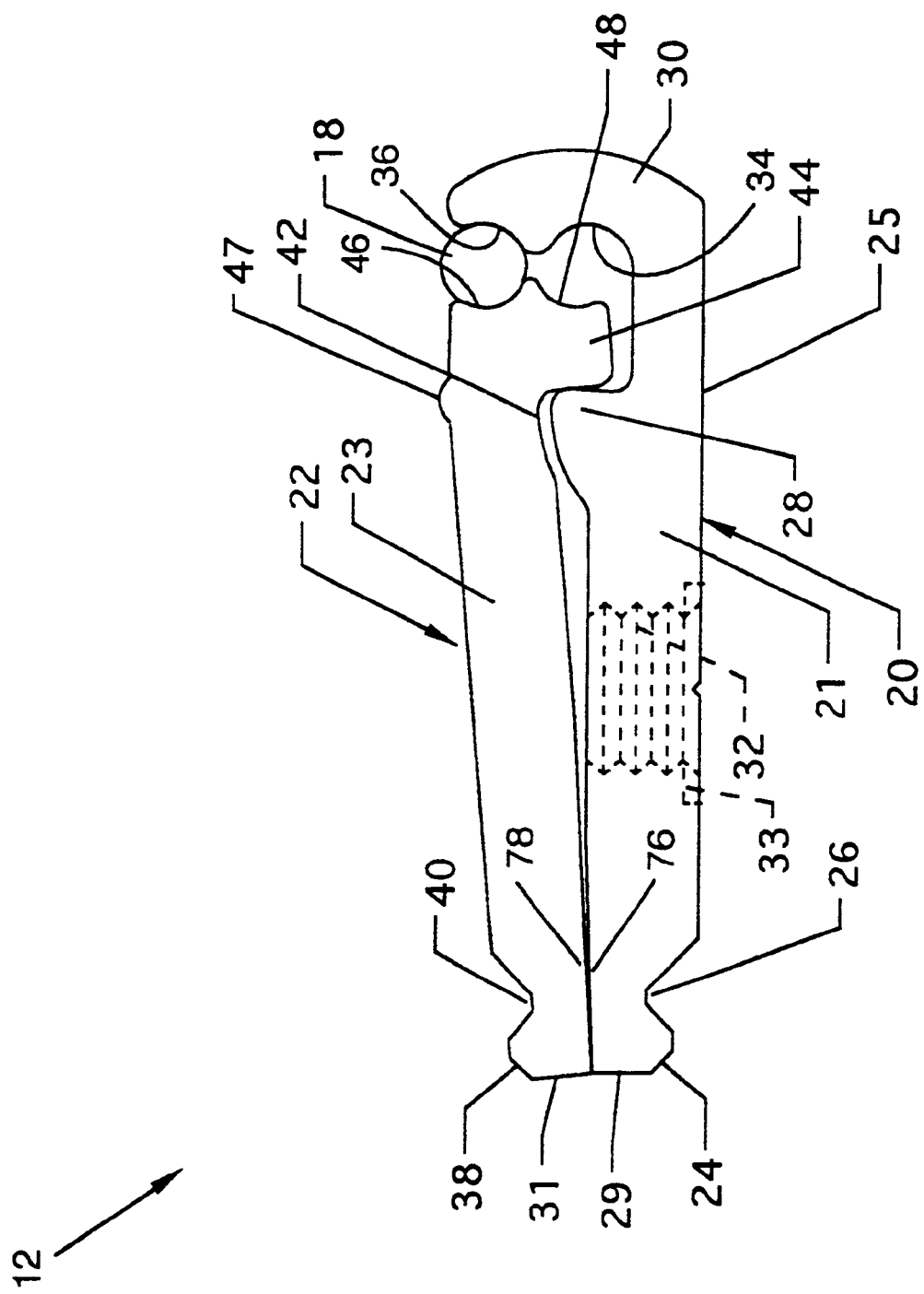
FIG. 4 illustrates a top view of the assembled jaw assembly where the resilient plastic pin is located in a position to bias the major and minor jaws to the closed position.

FIG. 4 illustrates a top view of the assembled jaw assembly 12, where all numerals correspond to those elements previously described. In this figure, the resilient plastic pin 18 is located in a position to bias the major and minor jaws 20 and 22 to the closed position where the ends 29 and 31 of the major and minor jaws 20 and 22 are forced together to facilitate engagement of the ends 29 and 31 of the major and minor jaws 20 and 22 with a suitably-shaped configured slot. The resilient plastic pin 18 is located between the truncated circular channel 36 of the major jaw 20 and the truncated circular channel 46 of the minor jaw 22 to urge the major and minor jaws 20 and 22 to the closed position about the mutually engaged pivot bar 28 of the major jaw 20 and the pivot receptor groove 42 of the minor jaw 22. The mutual engagement of the pivot bar 28 of the major jaw 20 with the pivot receptor groove 42 of the minor jaw 22 is such that lateral movement of the minor jaw 22 with respect to the major jaw 20 in the direction of the ends 29 and 31 is prevented, while pivotal action of the major and minor jaws 20 and 22, respectively, is still allowed.

Figure 5:
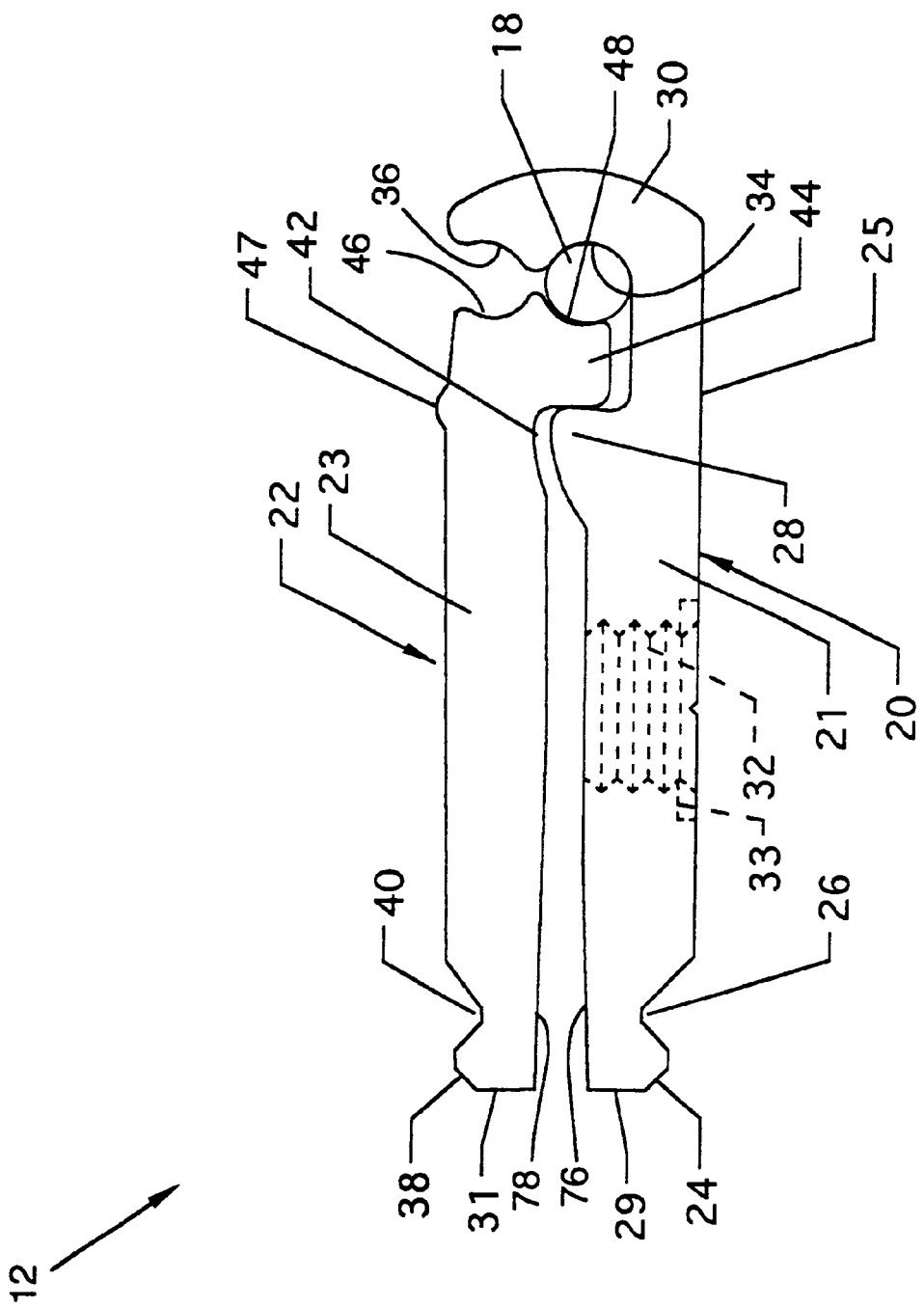
FIG. 5 illustrates a top view of the assembled jaw assembly where the resilient plastic pin is located in a position to bias the major and minor jaws to the open position.

FIG. 5 illustrates a top view of the assembled jaw assembly 12, where all numerals correspond to those elements previously described. In this figure, the resilient plastic pin 18 is located in a position to bias the major and minor jaws 20 and 22 to the open position where the ends 29 and 31 of the major and minor jaws 20 and 22 are forced apart to provide for snapping engagement of the ends 29 and 31 of the major and minor jaws 20 and 22 with a suitably-shaped configured slot. The resilient plastic pin 18 is located between the truncated circular channel 34 of the major jaw 20 and the truncated circular channel 48 of the minor jaw 22 to urge the major and minor jaws 20 and 22 to the open position about the mutually engaged pivot bar 28 of the major jaw 20 and the pivot receptor groove 42 of the minor jaw 22. Although the ends 29 and 31 of the major and minor jaws 20 and 22 are forced apart by the action of the resilient plastic pin 18, the ends 29 and 31 of the major and minor jaws can be actuated inwardly toward each other by members of a suitably-shaped configured slot for snapping engagement thereto, as later described in detail. The mutual engagement of the pivot bar 28 of the major jaw 20 with the pivot receptor groove 42 of the minor jaw 22 is such that lateral movement of the minor jaw 22 with respect to the major jaw 20 in the direction of the ends 29 and 31 is prevented, while pivotal action of the major and minor jaws 20 and 22, respectively, is still allowed.

Figure 6:
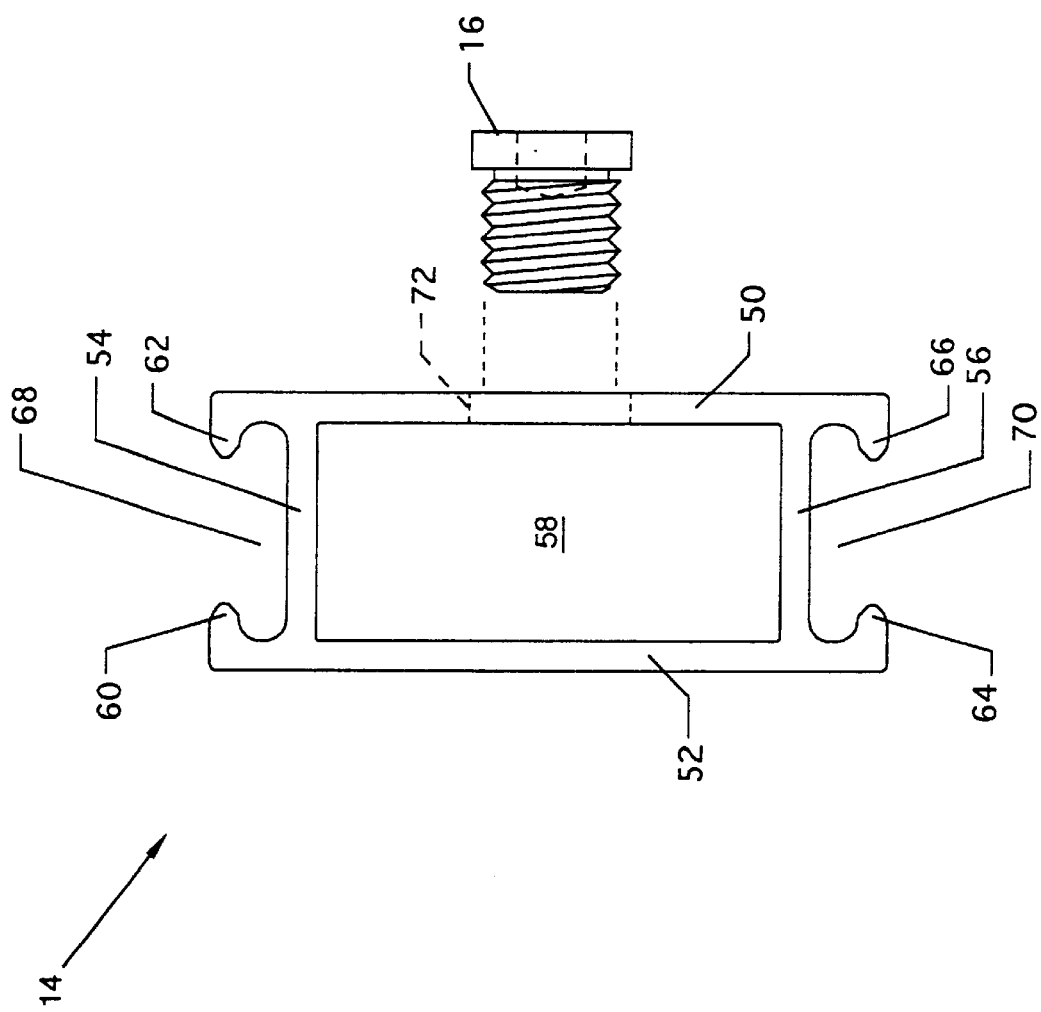
FIG. 6 illustrates an end view of the configured rectangular tube.

FIG. 6 illustrates an end view of the configured rectangular tube 14.

MODE OF OPERATION

Figure 7:
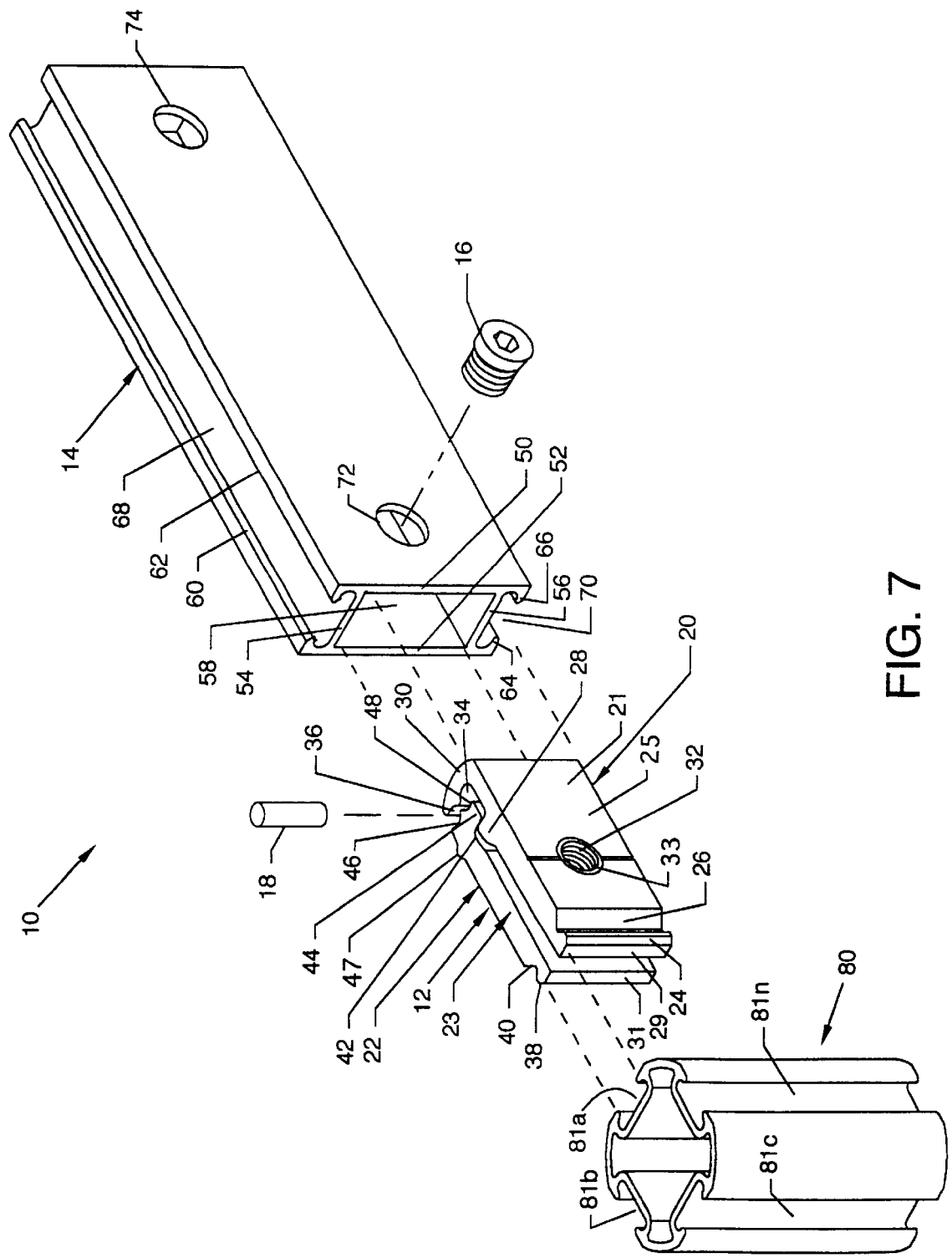
FIG. 7 illustrates a semi-exploded isometric view of the elements of the attachment system for configured slots.

FIGS. 7–13 illustrate the mode of operation of the clamping system 12. FIG. 7 illustrates a semi-exploded isometric view of the elements of the clamping system for configured tubing 10 substantially in alignment with a configured tube 80 having a plurality of suitably-shaped configured slots 81a–81n about the circumference thereof. The essential working geometry of the suitably-shaped configured slots 81a–81n and the working geometry of the channels 68 and 70 at the upper and lower regions of the configured rectangular tube 14 are similar, and thus it is to be noted that a jaw assembly 12 could be attached vertically to the upper channel 68 or to the bottom channel 70 for other connections thereto of other suitably-shaped objects. The resilient plastic pin 18 is shown prior to engagement at a suitable location near extension 30 of the major jaw 20 and extension 44 of the minor jaw 22.

Figure 8:
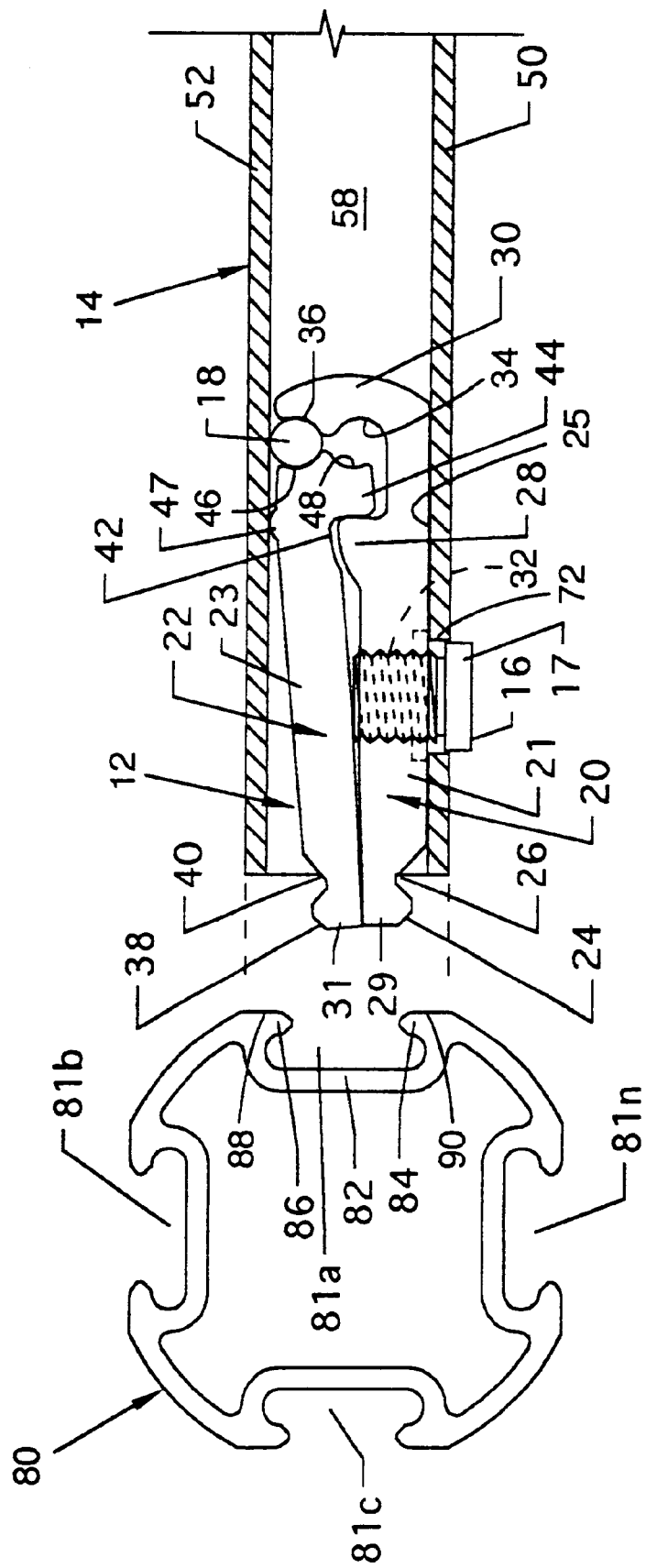
FIG. 8 illustrates a partial cutaway view of the jaw assembly in the biased closed position and inserted into the receptor cavity of the configured rectangular tube prior to engagement of the jaw assembly and attached configured rectangular tube with a configured slot of a configured tube.

FIG. 8 illustrates the jaw assembly 12 in the biased closed position and inserted into the receptor cavity 58 of the configured rectangular tube 14 prior to engagement of the jaw assembly 12 and attached configured rectangular tube 14 with the suitably-shaped configured slot 81a of the configured tube 80. The configured rectangular tube 14 is shown in cross section. The jaw assembly 12 is assembled, as described in relation to FIG. 4, where the resilient plastic pin 18 is located in a position to bias the major and minor jaws 20 and 22 to the closed position where the ends 29 and 31 of the major and minor jaws 20 and 22 are forced together to facilitate engagement of the ends 29 and 31 of the major and minor jaws 20 and 22 with suitably-shaped configured slots 81a–81n. The actuator cap screw 16 engages the threaded hole 32 of the major jaw 22 and the body hole 72 of the configured rectangular tube 14 to loosely secure the jaw assembly 12 in the receptor cavity 58. The suitably-shaped configured slots 81a–81n of the configured tube 80 each includes an inwardly-located panel 82, opposing lips 84 and 86 extending in a curved fashion from the panel 82 and planar surfaces 88 and 90 adjacent to the opposing lips 86 and 84, respectively.

Figure 9:
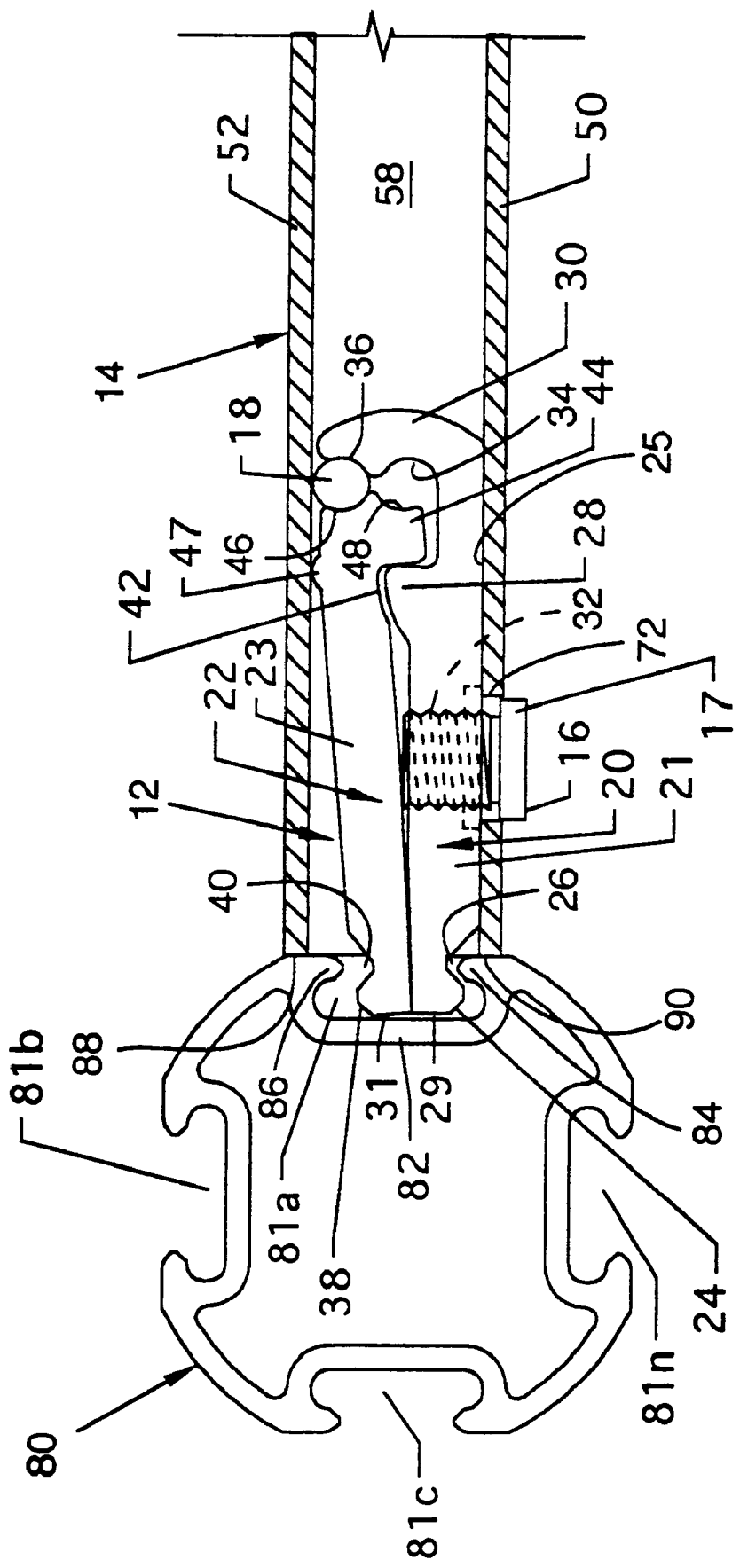
FIG. 9 illustrates a partial cutaway view of the jaw assembly in the biased closed position and inserted into the receptor cavity of the configured rectangular tube in the initial stage of engagement of the jaw assembly and attached configured rectangular tube with a configured slot of a configured tube.

FIG. 9 illustrates the jaw assembly 12 in the biased closed position and inserted into the receptor cavity 58 of the configured rectangular tube 14 (shown in cross section) in the initial stage of engagement of the jaw assembly 12 and attached configured rectangular tube 14 with the suitably-shaped configured slot 81a of the configured tube 80 which positions the configured rectangular tube 14 to contact the planar surfaces 88 and 90 of the configured tube 80. The outwardly-facing retainer grooves 26 and 40 are loosely aligned with the lips 84 and 86 of the configured tube 80 to await tightening, as described in relation to FIG. 10.

Figure 10:
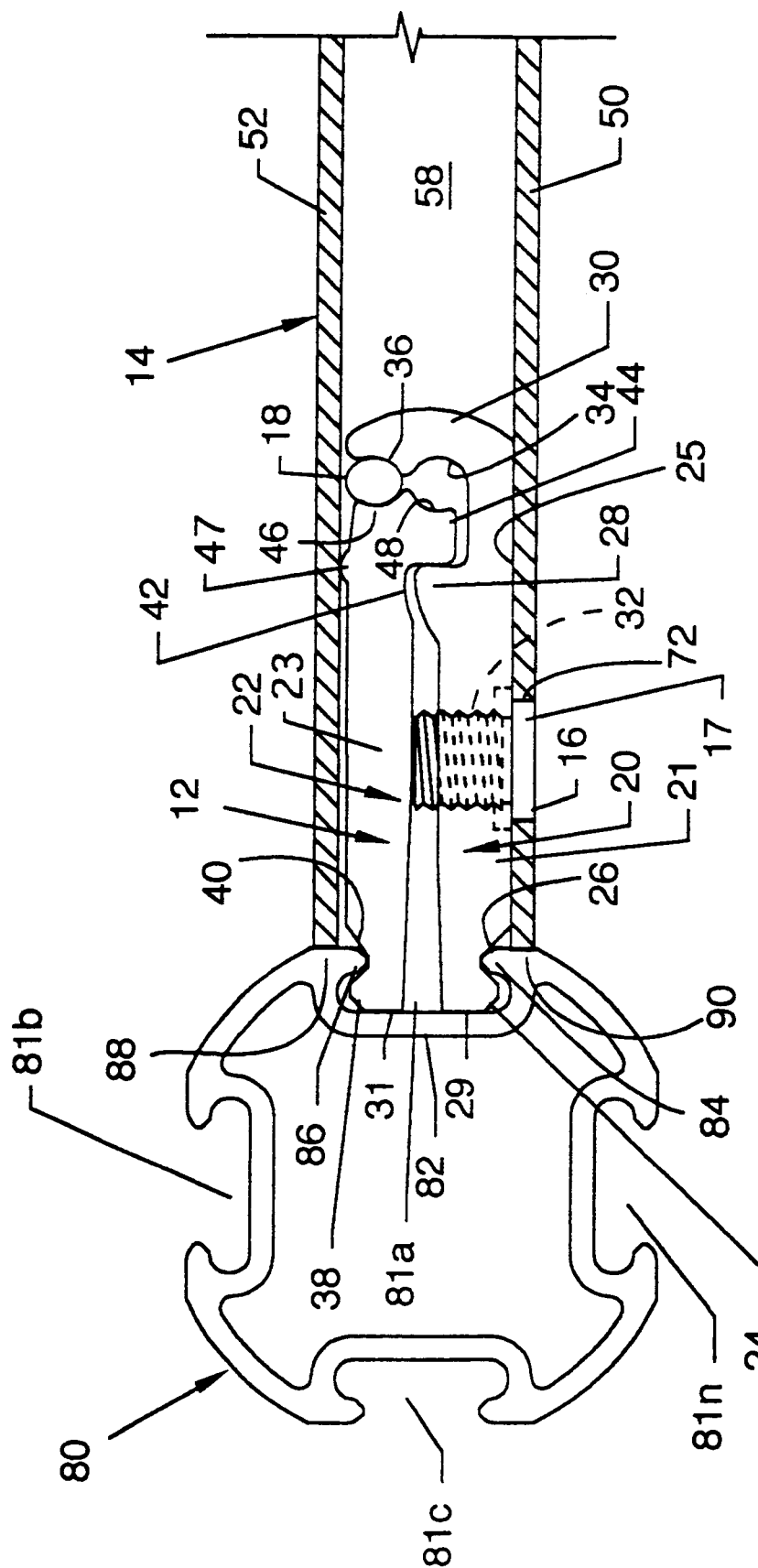
FIG. 10 illustrates a partial cutaway view of the jaw assembly inserted into and secured in the receptor cavity of the configured rectangular tube in the final stage of engagement of the jaw assembly and attached configured rectangular tube with a configured slot of a configured tube.

FIG. 10 illustrates the jaw assembly 12 inserted into and secured in the receptor cavity 58 of the configured rectangular tube 14 (shown in cross section) in the final stage of engagement of the jaw assembly 12 and attached configured rectangular tube 14 with the suitably-shaped configured slot 81a of configured tube 80. The actuator cap screw 16 is rotated and advanced through the major jaw 20 to bear against the minor jaw 22, thus having the net effect of forcing the major and minor jaws 20 and 22, respectively, to the open position. The jaw assembly 12 is secured to the configured rectangular tube 14 by multiple methods. The first method involves the relationship of the actuator cap screw 16 to the body hole 72 in the configured rectangular tube 14. The head 17 of the actuator cap screw 16, when in captured alignment with the body hole 72, secures the jaw assembly 12 to the configured rectangular tube 14 and prevents the major jaw 20, and thus the jaw assembly 12, from lateral movement along the length of the receptor cavity 58 of the configured rectangular tube 14. The second method of securing involves the rotation of the actuator cap screw 16 which brings the planar surface 25 of the major jaw 20 and the contact bar 47 of the minor jaw 22 into intimate and forced frictional opposing engagement with the portions of the opposing vertical walls 50 and 52 which in part form the receptor cavity 58, to firmly secure the jaw assembly 12 to the configured tube 14. Advancing the actuator cap screw 16 forces the planar surface 25 of the major jaw 20 and the contact bar 47 of the minor jaw 22 into stabilized forced contact with the vertical walls 50 and 52. The planar surface 25 of the major jaw 20 forcibly aligns to the vertical wall 50, another planar surface, to provide "planar-to-planar" stabilized contact to prevent rotation or twisting of the jaw assembly 12 with respect to the configured rectangular tube 14. Also adding to stabilized contact is the forcible alignment of the contact bar 47 of the minor jaw 22 with the vertical wall 52 of the configured tube 14. During advancement of the actuator cap screw 16, the minor jaw 22 is positioned in generally parallel fashion and is held in a constant relative parallel position to the major jaw 20 by the slipping engagement of the appropriate vertical surfaces of the pivot bar 28 and the pivot receptor groove 42, thus alignment of the retainer grooves 28 and 42 are held in a constant oppositional relationship.

Anchoring or securing of the jaw assembly 12 to the suitably-shaped configured slot 81 of the configured tube 80 occurs as the major and minor jaws 20 and 22 are forced apart to the open position, whereby the shorter angled surfaces of the outwardly-facing retainer grooves 26 and 40 are brought into sliding contact with the lips 84 and 86 (configured slot), respectively, of the configured tube 80 and bear against the lips 84 and 86, respectively, in forced and locking contact therewith. The jaw assembly 12 and the attached configured rectangular tube 14 are repositioned slightly in the direction of the ends 29 and 31 as a result of the sliding contact, and as a result the ends of the vertical walls 50 and 52 are brought into close intimate forced and stable contact with the planar surfaces 90 and 88 of the configured tube 80 to create a strong and stable connection between the configured rectangular tube 14 and the configured tube 80.

Such synergistic coupling creates an attachment system for suitably-shaped configured slots where outwardly acting forces promote and provide for stability distributed along and across the attachment of the configured rectangular tube 14, the jaw assembly 12, and the configured tube 80 having suitably-shaped configured slots 81a–81n. A combination of the opposingly and outwardly forced major and minor jaws 20 and 22, respectively, and of the engagement of the jaw ends 29 and 31 provides for multiple forced stable contact regions, thereby providing for a stable attachment.

Figure 11:
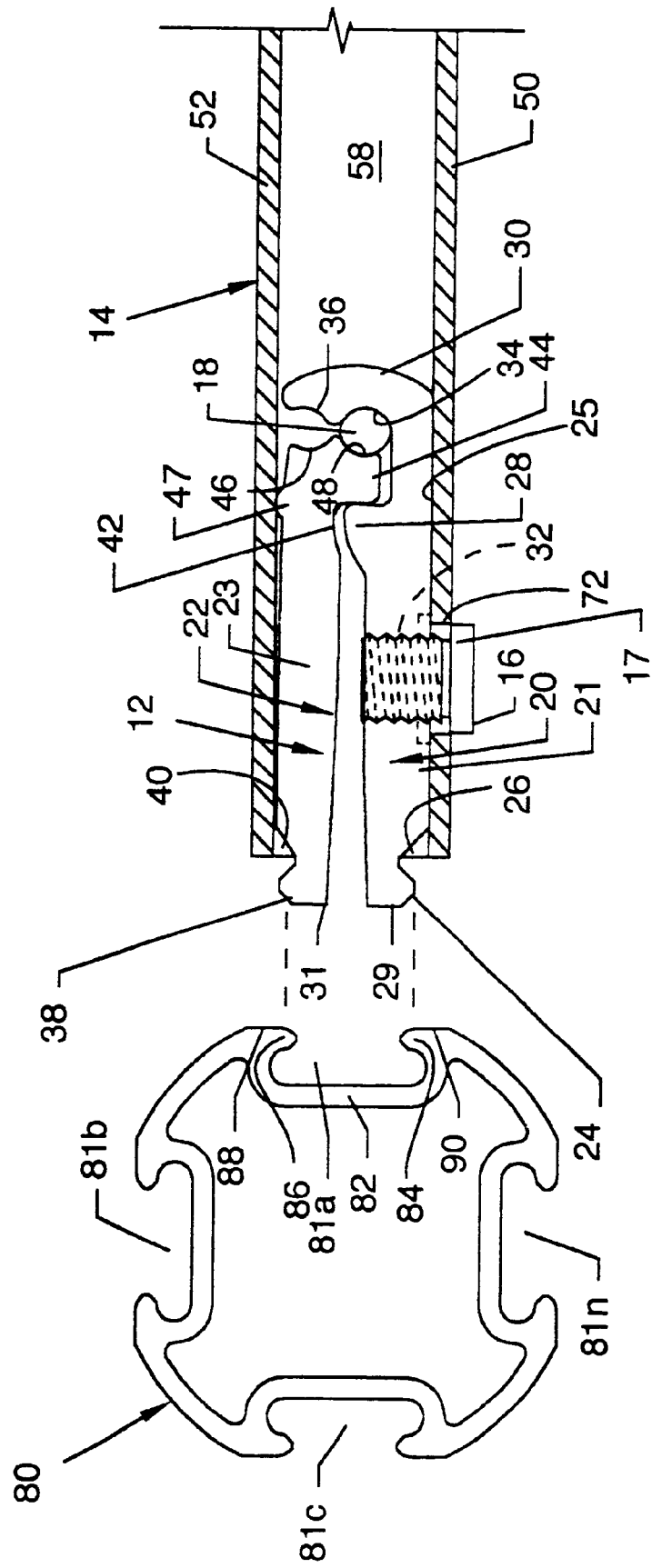
FIG. 11 illustrates a partial cutaway view of the jaw assembly in the biased open position and inserted into the receptor cavity of the configured rectangular tube prior to engagement of the jaw assembly and attached configured rectangular tube with a configured slot of a configured tube.

FIG. 11 illustrates the jaw assembly 12 in the biased open position and inserted into the receptor cavity 58 of the configured rectangular tube 14 prior to engagement of the jaw assembly 12 and attached configured rectangular tube 14 with the suitably-shaped configured slot 81a of the configured tube 80. The configured rectangular tube 14 is shown in cross section. The jaw assembly 12 is assembled, as described in relation to FIG. 5, where the resilient plastic pin 18 is located in a position to bias the major and minor jaws 20 and 22 to the open position where the ends 29 and 31 of the major and minor jaws 20 and 22 are forced apart to facilitate snapping engagement of the ends 29 and 31 of the major and minor jaws 20 and 22 with a suitably-shaped configured slots 81a–81n. The actuator cap screw 16 engages the threaded hole 32 of the major jaw 22 and the hole 72 of the configured rectangular tube 14, but the threads do not extend beyond the major jaw 20, to loosely secure the jaw assembly 12 in the biased open position in the receptor cavity 58. The outwardly-facing planar surface 25 of the major jaw 20 and the contact bar 47 of the minor jaw 22 are in intimate low force frictional engagement with the portion of the vertical walls 50 and 52 which in part form the receptor cavity 58, thus securing the jaw assembly 12 to the configured rectangular tube 14 by low force frictional engagement. The major and minor jaws 20 and 22 must be flexed and displaced inwardly toward each other against the resistance provided by the resilient plastic pin 18 to allow entry of the ends 29 and 31 of the major and minor jaws 20 and 22 beyond the lips 84 and 86 of the suitably-shaped configured slot 81a and fully into the suitably-shaped configured slot 81a. During engagement the chamfers 24 and 38 of the major and minor jaws 20 and 22 slidingly and displaceably engage the lips 84 and 86 of the suitably-shaped configured slot 81a, and the major and minor jaws 20 and 22 are flexed and displaced inwardly to allow subsequent snapping engagement of the outwardly-facing retainer grooves 26 and 40 of the major and minor jaws 20 and 22 with the lips 84 and 86 of the suitably-shaped configured slot 81a. Such snapping engagement is desirable especially when constructing large assemblies of multiple components where multiple jaw assemblies and configured rectangular tubes may be mated and then positioned prior to final tightening of the actuator cap screws 16.

Figure 12:
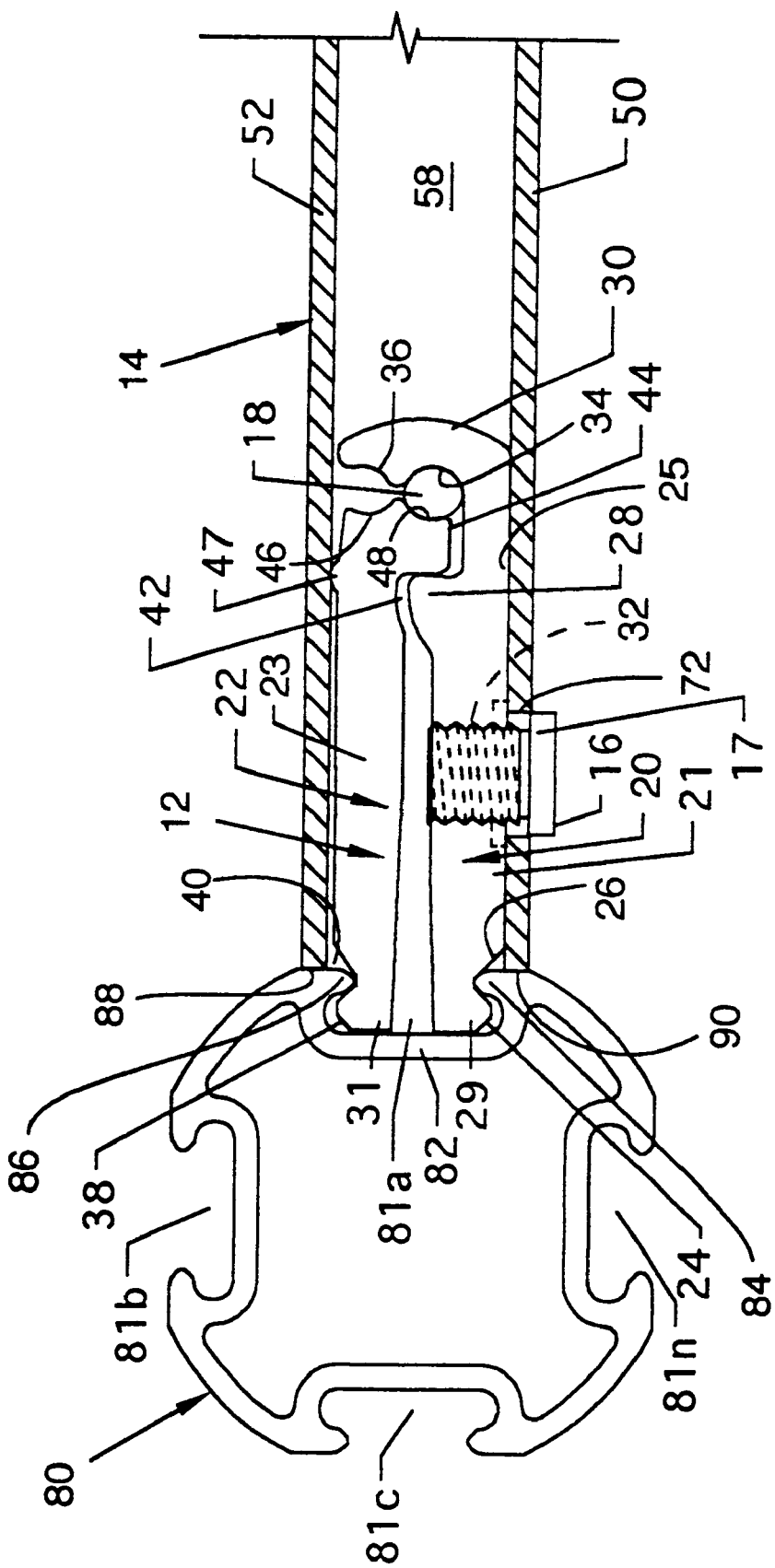
FIG. 12 illustrates a partial cutaway view of the jaw assembly in the biased open position and inserted into the receptor cavity of the configured rectangular tube just subsequent to snapping engagement of the jaw assembly and the attached configured rectangular tube with a configured slot of a configured tube; and, FIG. 13 illustrates a partial cutaway view of the jaw assembly in the biased open position firmly securing the configured rectangular tube to a suitably-shaped configured slot of a configured tube by action of the actuator cap screw with the jaw assembly.

FIG. 12 illustrates the jaw assembly 12 in the biased open position and residing in the receptor cavity 58 of the configured rectangular tube 14 just subsequent to snapping engagement of the jaw assembly 12 and attached configured rectangular tube 14 with the suitably-shaped configured slot 81a of the configured tube 80. The configured rectangular tube 14 is shown in cross section.

Figure 13:
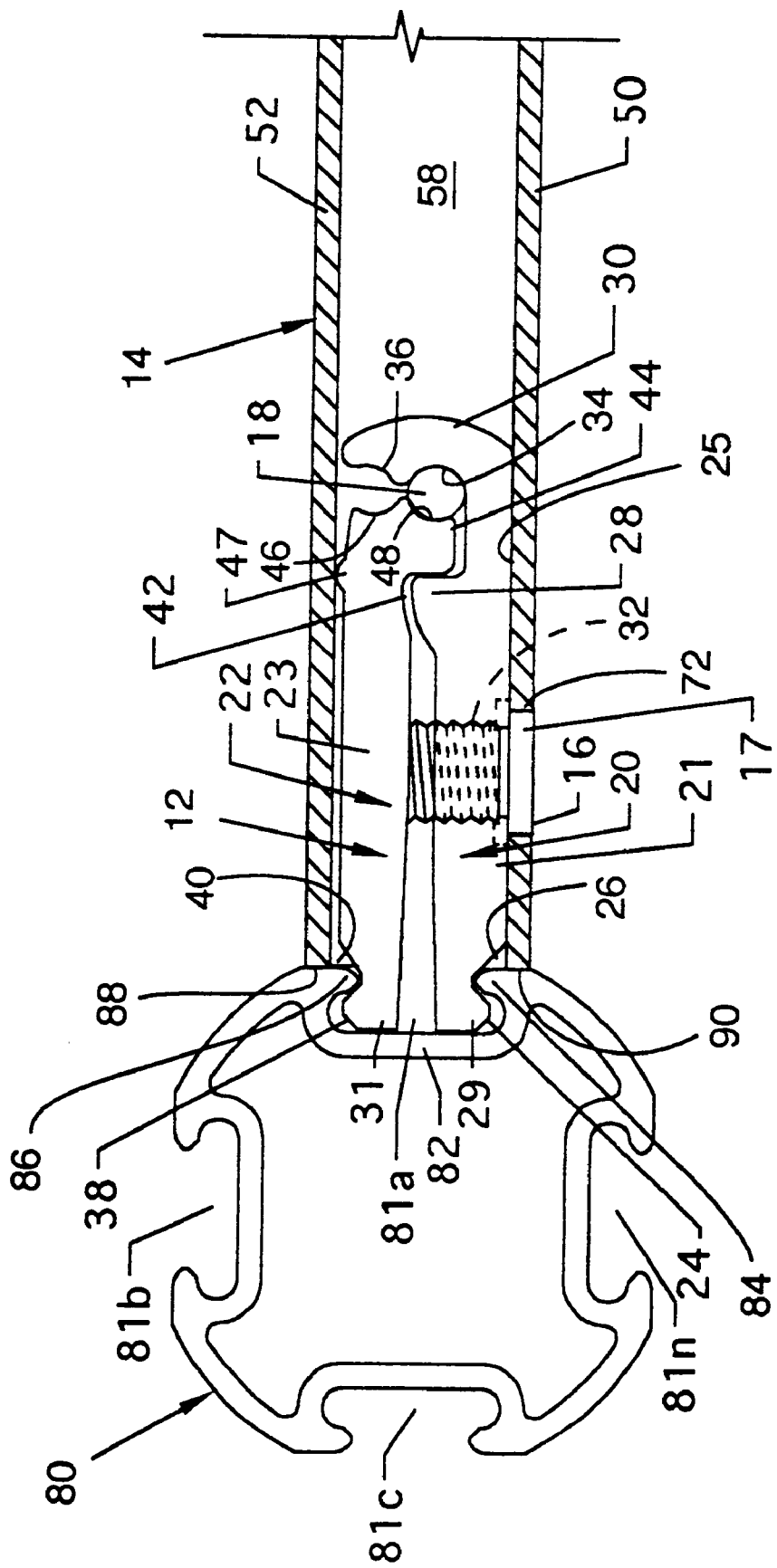

FIG. 13 illustrates the jaw assembly 12 in the biased open position firmly securing the configured rectangular tube 14 to the suitably-shaped configured slot 81a of the configured tube 80 by action of the actuator cap screw 16 with the jaw assembly 12. Subsequent to snapping engagement of the jaw assembly 12 and the attached configured rectangular tube 14 with the configured tube 80, the actuator cap screw 16 is rotated and advanced through the major jaw 20 to bear against the minor jaw 22, as previously described in relation to FIG. 10 to secure the jaw assembly 12 to the suitably-shaped configured slot 81a of the configured tube 80.

Various modifications can be made to the present invention without departing from the apparent scope hereof.

It is claimed:

1. A jaw assembly comprising:
   a. a major jaw;
   b. a minor jaw opposing the major jaw and aligned in close pivotal juxtaposition with the major jaw; and,
   c. a pin, located between the major jaw and the minor jaw, the pin being separable from the major jaw and the minor jaw, wherein the major jaw includes an inwardly-facing pivot bar which aligns to and which engages an inwardly-facing pivot receptor groove in the minor jaw.

2. The jaw assembly of claim 1, wherein the pin is a plastic pin.

3. The jaw assembly of claim 1, wherein the pin is a resilient pin.

4. The jaw assembly of claim 1, wherein the pin is a resilient plastic pin.

5. The jaw assembly of claim 1, wherein the major jaw has a threaded hole and the jaw assembly further includes an actuator cap screw, the actuator cap screw engaging the threaded hole of the major jaw and bearing against the minor jaw, wherein rotation of the actuator cap screw forces the major jaw and the minor jaw to an open position.

6. The jaw assembly of claim 5, further comprising a configured rectangular tube, the configured rectangular tube having a receptor cavity in an end of the configured rectangular tube, the receptor cavity capable of holding the jaw assembly with an end of the major jaw and an end of the minor jaw protruding from the receptor cavity.

7. The jaw assembly of claim 6, wherein the configured tube includes a body hole for capturing the cap screw actuator so as to secure the jaw assembly to the configured rectangular tube.

8. The jaw assembly of claim 7, further comprising a configured tube having a configured slot on the exterior of the configured tube, the configured tube engageable to the end of the major jaw and the end of the minor jaw protruding form the receptor cavity of the configured rectangular tube.

9. The jaw assembly of claim 8, wherein the engagement between the end of the major and the minor jaw with the configured slot of the configured tube is a slipping engagement which is stabilized by advanced rotation of the cap screw actuator.

10. The jaw assembly of claim 9, wherein advanced rotation of the cap screw actuator causes a stable connection between the configured rectangular tube and the configured tube.

11. A jaw assembly comprising:
   a. a major jaw and an opposing minor jaw aligned in close pivotal juxtaposition relative to the major jaw;
   b. a resilient plastic pin, the pin being separable from the major jaw and the minor jaw;
   c. the opposing major jaw having a first end and a second end, the first end having a major jaw chamfer forming an outwardly facing major jaw retaining groove, the second end having an inwardly facing pivot bar, and an extension having a first major jaw truncated circular channel and a second major jaw truncated circular channel, both channels facing towards the first end; and,
   d. the opposing minor jaw having a minor jaw first end and a minor jaw second end, the minor jaw first end having a minor jaw chamfer forming a minor jaw retaining groove which operates in unison with the major jaw chamfer and the major jaw retaining groove to secure to a suitably shaped configured slot, the minor jaw second end having an inwardly facing pivot receptor groove which aligns to and engages the inwardly facing pivot bar, a contact bar, and a small extension having a first miner jaw truncated circular channel which aligns with the first major jaw truncated circular channel defining a position in which the resilient plastic pin may be inserted to bias the opposing major jaw and the opposing minor jaw to an open or spread position, and a second minor jaw truncated circular channel which aligns with the second major jaw truncated circular channel defining a position in which the resilient plastic pin may be inserted to bias the opposing major jaw and the opposing minor jaw to a closed position.

12. The jaw assembly of claim 11, further comprising actuating means to open the jaw assembly.

13. The actuating means of claim 12, wherein the actuating means is an actuator cap screw, the actuator cap screw threadingly engaging the major jaw and opening the jaw assembly by rotating the actuator cap screw.

14. The jaw assembly of claim 13, wherein the jaw assembly is insertable into a suitably shaped receptor cavity, with the second ends of the opposing major and minor jaws disposed within the receptor cavity, the receptor cavity having two opposed vertical walls and two opposed horizontal walls, one opposed vertical wall having a body hole aligned with the actuator cap screw, the two opposed horizontal walls each having two inwardly facing lips defining a suitably-shaped configured slot on each opposing horizontal wall; and further wherein the major jaw chamfer, the outwardly facing major jaw retaining groove, the minor jaw chamfer and outwardly facing minor jaw retaining groove extending from the receptor cavity to secure to a suitably-shaped configured slot.

15. The jaw assembly of claim 14, wherein the contact bar the contact bar may be forced into intimate fictional opposing engagement with one of the opposing vertical walls of the receptor cavity when the jaw assembly is opened.

16. A method of connecting, the method comprising the steps of:
   a. providing a jaw assembly, the jaw assembly including:
      (1) a major jaw and an opposing minor jaw aligned in close pivotal juxtaposition relative to the major jaw;
      (2) a resilient plastic pin, the pin being separable from the major jaw and the minor jaw;
      (3) the opposing major jaw having a first end and a second end, the first end having a major jaw chamfer forming an outwardly facing major jaw retaining groove, the second end having an inwardly facing pivot bar, and an extension having a first major jaw truncated circular channel and a second major jaw truncated circular channel, both channels facing towards the first end; and,
      (4) the opposing minor jaw having a minor jaw first end and a minor jaw second end, the minor jaw first end having a minor jaw chamfer forming a minor jaw retaining groove which operates in unison with the major jaw chamfer and the major jaw retaining groove to secure to a suitably shaped configured slot, the minor jaw second end having an inwardly facing pivot receptor groove which aligns to and engages the inwardly facing pivot bar, a contact bar, and a small extension having a first miner jaw truncated circular channel which aligns with the first major jaw truncated circular channel defining a position in which the resilient plastic pin may be inserted to bias the opposing major jaw and the opposing minor jaw to an open or spread position, and a second minor jaw truncated circular channel which aligns with the second major jaw truncated circular channel defining a position in which the resilient plastic pin may be inserted to bias the opposing major jaw and the opposing minor jaw to a closed position;
   b. providing a configured rectangular tube having a suitably shaped receptor cavity to accept the jaw assembly;
   c. providing an actuator cap screw;
   d. inserting the resilient plastic pin between the second minor jaw truncated circular channel and the second major jaw truncated circular channel or inserting the resilient plastic pin between the first minor jaw truncated circular channel and the first major jaw truncated circular channel;
   e. inserting the jaw assembly in to the suitably-shaped receptor cavity;
   f. extending the actuator cap screw through the body hole of the opposing horizontal wall of the suitably-shaped receptor cavity threadingly engaging the threaded hole of the opposing major jaw;
   g. inserting the major jaw chamfer, the outwardly facing major jaw retaining groove, the minor jaw chamfer, and the outwardly facing minor jaw retaining groove into a suitably-shaped configured slot; and,
   h. rotating the actuator cap screw to actuate the jaw assembling thereby securing the jaw assembly to the suitably shaped configured slot.

\* \* \* \* \*